(12) United States Patent
Key et al.

(10) Patent No.: US 10,972,809 B1
(45) Date of Patent: Apr. 6, 2021

(54) VIDEO TRANSFORMATION SERVICE

(71) Applicant: Amazon Technologies, Inc., Seattle, WA (US)

(72) Inventors: Justin Key, Seattle, WA (US); Silas Brown, Seattle, WA (US); Eric Orme, Shoreline, WA (US); Peter Schwabland, Lake Forest Park, WA (US); Nathan W. Bartel, Sumner, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/834,417

(22) Filed: Mar. 30, 2020

(51) Int. Cl.
*H04N 21/854* (2011.01)
*H04N 21/81* (2011.01)

(52) U.S. Cl.
CPC ......... *H04N 21/854* (2013.01); *H04N 21/812* (2013.01); *H04N 21/8106* (2013.01)

(58) Field of Classification Search
CPC ... H04N 21/54; H04N 21/8106; H04N 21/812
See application file for complete search history.

(56) References Cited

U.S. PATENT DOCUMENTS

| | | | |
|---|---|---|---|
| 2007/0038670 A1* | 2/2007 | Dettori | G06F 16/24 |
| 2009/0089131 A1* | 4/2009 | Moukas | G06Q 10/0631 705/70 |
| 2014/0188978 A1* | 7/2014 | Ng | H04L 67/10 709/203 |
| 2020/0193163 A1* | 6/2020 | Chang | H04N 21/44008 |

* cited by examiner

*Primary Examiner* — Mishawn N. Hunter
(74) *Attorney, Agent, or Firm* — Kilpatrick Townsend & Stockton LLP

(57) ABSTRACT

Techniques are disclosed for generating media delivery packages from a source package. The techniques include receiving, by a computer system, a source package associated with a content item. Upon receiving the source package, the computer system determines a plurality of workflows, whereby each workflow is operable for generating a delivery package of a plurality delivery packages. A workflow defines parameters for execution of one or more transformation modules of a set of transformation modules of a media transformation service (MTS). The MTS generates the plurality of delivery packages based at least in part on the source package and an execution of respective workflows. The computer system then provides the plurality of delivery packages to respective target entities for distribution.

20 Claims, 9 Drawing Sheets

# VIDEO TRANSFORMATION SERVICE

BACKGROUND

Multimedia distribution services exist that service different markets (e.g., target customers and/or geographic regions). In one example, a first distribution service may distribute video content for customers in Japan, while a second distribution service may distribute video content for customers in Germany. Each distribution service may mandate content delivery specifications (e.g., formats or standards) for content providers that provide content to the respective distribution service. In some cases, the content delivery specifications may be unique to the particular distribution service and/or market. For example, a video content provider (e.g., movie studio) may create a movie title and wish to have the movie distributed by both the first and second distribution services (e.g., for reaching audiences in both Japan and Germany). Accordingly, the movie studio may perform a first set of tasks to prepare the movie content for distribution by the first distribution service, and a second set of tasks to prepare the movie content for distribution by the second distribution service. As the number of markets increases, the resources required to prepare content for distribution can become daunting even for larger content providers, resulting in reduced distribution of content.

There is a need for improved efficiency in preparing multimedia content for distribution in different markets.

BRIEF DESCRIPTION OF THE DRAWINGS

Various embodiments in accordance with the present disclosure will be described with reference to the drawings, in which.

DETAILED DESCRIPTION

Figure 1:
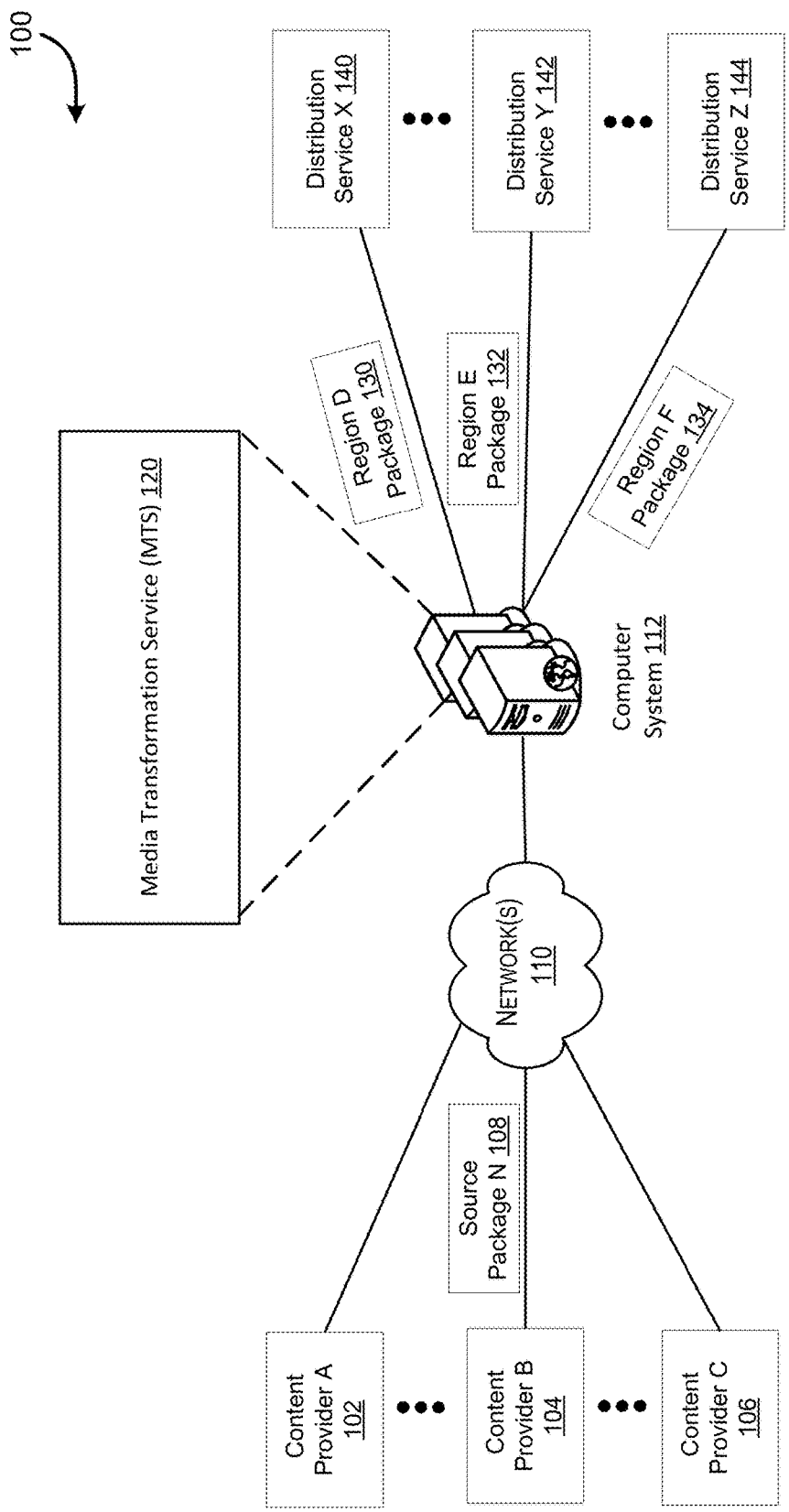
FIG. 1 is a schematic diagram illustrating an example system for a media transformation service (MTS) generating media delivery packages for distribution to target entities, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a computer system that generates one or more media delivery packages from a single source package. The source package may be associated with a unique content item (e.g., a movie, a TV episode, etc.) and may include one or more source files. Each source file of the source package may have a particular type, of a set of possible types (e.g., a video type, an audio track type, a timed text type, etc.), that is associated with the unique content item. The computer system may include a media transformation service (MTS). The MTS may receive the single source package as input, for example, from a content provider (e.g., a movie studio). The MTS determines (e.g., generates) one or more workflows, whereby each workflow is operable (e.g., executable) for generating a media delivery package (also known as "delivery package") based at least in part on the single source package. In some embodiments, the one or more workflows may be determined based at least in part on one or more inputs (e.g., the single source package, a source manifest received alongside the source package, a delivery profile associated with the content provider, etc.). Each workflow may define parameters for an execution of one or more transformation modules of a set of transformation modules of the MTS. In some embodiments, the parameters of a workflow may be updated (e.g., for generating a new delivery package) without requiring the transformation modules to be updated (e.g., without requiring new code to be compiled). The MTS may execute each of the workflows to generate respective delivery packages, and then may provide the delivery packages to one or more target entities (e.g., different distribution services, and/or different customer segments, for example, in different geographic regions) for distribution. In some embodiments, the particular set of file types of source files of the source package and the particular set of transformation modules are defined so that, for a given set of target entities (e.g., with different formatting requirements), the MTS may generate delivery packages for each target entity based at least in part on the single source package received as input.

In an illustrative example, consider a scenario in which an MTS of the computer system generates one or more delivery packages for a content provider (e.g., a movie studio) that wishes to publish a media content (e.g., a movie title, or any suitable audio-visual (AV) media) for distribution in multiple geographic regions (e.g., the United States (U.S.), Japan, and Germany). The video content associated with the movie title may have an original video ("OV") audio track that is in English (EN), with OV subtitles. The content provider may compile media source files associated with the movie title into a single source package, each source file having a particular predefined type. For example, the source package may contain a compressed video file (e.g., a "mezzanine") of the movie title, which, in an example, may be encoded in a Ultra High Definition (UHD) format with High Dynamic Range (HDR). The UHD HDR mezzanine (e.g., MP4 file format) may include (e.g., embed) an OV audio track, and the mezzanine may have a video type (e.g., an AV file type). Additionally, the source package may also contain, for example, two alternate audio track files, each having an audio track type (e.g., a Japanese (JP) audio track and a German (DE) audio track), two timed text files, each having a timed text type (e.g., respectively containing captions for the movie in Japanese and German), a metadata file having a metadata type (e.g., describing individual files ("assets") within the source package), and three images, each having an image type (e.g., included for branding the movie with a logo for the respective geographic regions). As described further herein, the source package may also contain other source files to be used as input for generating one or more delivery packages for a particular geographic region (e.g., forced narrative sub-title files, dub card files, etc.). Each of the other source files may be associated with a particular predefined file type.

In some embodiments, the source package may be associated with a source manifest file and/or a delivery profile. For example, the source manifest may be received alongside (or contained within) the source package, and may provide instructions (e.g., rules) for generating one or more delivery packages from the source files in the source package. For example, the source manifest may provide that delivery packages are to be generated for three geographic regions: the U.S., Japan, and Germany. In some embodiments, the source manifest may indicate one or more distribution services that will each host one or more of the delivery packages for end-users. In one example, each distribution service may be a cloud-based distribution service that enables users to stream the movies on-demand in English, Japanese, or German. For example, a first distribution service may primarily serve customers in the U.S., while a second distribution service may primarily serve customers in Europe and Asia. Each distribution service may have its own set of requirements (e.g., AV formatting requirements, legal compliance requirements, standards, etc.) for presenting media content in particular geographic regions and/or markets. As described above, in some embodiments, a delivery profile may also be used to provide instructions for generating the one or more delivery packages. In some embodiments, the delivery profile (or "profile") may be used for similar or different functions as described above, in regards to the source manifest. For example, the computer system may maintain a predefined profile on behalf of the content provider, so that whenever new source packages are received from the content provider, the computer system generates delivery packages according to the instructions of the profile. As described further herein, in some embodiments, a profile may be used in addition/complementary to (or instead of) a source manifest. It should be understood that, although the computer system may utilize a source manifest and/or profile to generate delivery packages, embodiments should not be construed to be so limiting. For example, as described herein, in some embodiments, the computer system may determine workflows for generating delivery packages based primarily (e.g., solely) on analyzing the media assets of the source package.

Continuing with the illustration above, the computer system may receive the source package from the content provider (e.g., over a suitable network). In some embodiments, an MTS of the computer system may then determine one or more workflows, each workflow to be used for generating a delivery package to be delivered to one or more distribution services. As described above, in some embodiments, the system may also utilize other inputs to generate the one or more workflows (e.g., a source manifest file, preexisting content provider profile). Each workflow may define parameters for an execution of one or more transformation functions of the MTS. For example, each workflow may indicate at least one of (1) a particular ordering of the execution of the one or more transformation modules, or (2) a particular input for each transformation module (e.g., an instruction for a type of algorithm to use). For example, in some embodiments, a transformation module of the MTS may receive one or more inputs (e.g., source files, intermediate files, parameters, etc.) and output one or more transformed files. Although embodiments described herein may describe a transformation module receiving a source file as input, it should be understood that the particular module may actually operate on the corresponding content within the source file (e.g., video content and/or embedded audio track content within a video file, timed text within a timed text file, etc.). In some embodiments, the set of transformation modules may include four modules: an overlay module (e.g., for overlaying timed text and/or images on a portion of the movie content), a stitching module (e.g., for including interstitial content at one or more locations within the movie, including the beginning and/or end), a color space transformation module (e.g., for transforming the movie from one color space and/or resolution to another), and/or an audio muxing module (e.g., for mapping an alternate audio track to the movie video track). For example, one workflow may define parameters for an execution of transformation modules for generating a delivery package that includes delivery media files suitable for presentation of the movie in German. For example, the workflow may include an execution of the audio muxing module to swap the OV audio track (e.g., English) with the German audio track. The workflow may also include an execution of the overlay module to remove the OV subtitles in English and instead overlay the movie with German subtitles (e.g., using the German timed text file). The overlay module may also be used to overlay a logo image of a particular movie studio on a portion of the movie. It should be understood that any suitable number and/or definition of workflows may be generated for use in generating one or more delivery packages from a source package. Also, in some embodiments, when generating the one or more workflows, the system may receive input from one or more sources (e.g., besides the content provider). For example, as described further herein, the computer system may receive input from a third-party or administrator of the system that specifies updated requirements (e.g., legal compliance requirements, updated branding images, updated instructions for advertisement cue points, etc.) for delivering media content to a target entity (e.g., a particular distribution service, region and/or market). These updated requirements (e.g., an updated legal compliance document or other business requirement) may be used by the system to determine updated parameters of a workflow for executing one or more of the transformation modules (e.g., overlaying subtitles for the Japanese region in a vertical orientation (instead of a horizontal orientation). As described above, it should be understood that workflows may be generated and/or updated (e.g., based on different source package compositions, updated business requirements, etc.) without requiring the set of transformation modules to be modified (e.g., without requiring code modification and/or re-compilation). Similarly, in some embodiments, the set of transformation modules may be updated (e.g., adding a new algorithm for performing a function) independently of business requirements of the system.

Upon the system generating one or more delivery packages, respectively, based on the one or more workflows, the system may provide the delivery packages to the appropriate target entities (e.g., distribution services). For example, continuing with the illustration above, the system may transmit three (e.g., English, Japanese, and German language) delivery packages to a distribution service in the U.S., while the system may transmit only German and Japanese delivery packages to the distribution service that serves the Europe and Asian markets. It should be understood that any suitable number and type of delivery packages may be generated based on the workflows generated by the system. For example, although, in this illustration, only three languages are referenced, in another example, delivery packages for other languages may be generated. In another example, the same movie with German audio and/or subtitles may nevertheless have multiple delivery packages, one for each distribution service that that hosts the movie content (e.g., each video having a different logo branded according to the particular hosting distribution service). Accordingly, each delivery package may vary according one or more factors (e.g., the number of delivery files included and/or the content of each delivery file).

The embodiments of the present disclosure may provide many technological benefits over existing systems. For example, conventional methods for generating delivery packages are typically error-prone, requiring manual performance of tasks by a content provider (or other third-party affiliated with the content provider). In one example, different distribution services may have different standards (e.g., different formats) governing insertion of placeholder (e.g., black) frames and associated advertisement cue points for generating a delivery package. The content provider may manually (e.g., using a third-party application) insert black frames and/or advertisement cue points at particular locations within the sequence of frames of a video content. However, sometimes, the content provider and/or third-party application may inadvertently insert the black frames/ad cue points at the wrong location. Additionally, the delivery packages often are targeted toward multiple distribution services and/or multiple regions (or combinations, thereof). Accordingly, the delivery package generation process for a given content item can involve a high degree of complexity and can take significant amounts of time, thus, further increasing the probability of errors. Additionally, it is difficult for a content provider to keep pace as new (or updated) requirements are received (e.g., based on regional requirements, distribution service requirements), thus, further slowing down the pipeline for providing video content to end-users.

In contrast, embodiments of the present disclosure enable a computer system to more efficiently generate media content suitable for one or more target entities (e.g., distribution services, geographic regions, markets, or combinations thereof), based on a single source package as input. For example, the computer system may automatically determine one or more workflows. Each workflow may be operable (e.g., executable) for generating a delivery package suitable for the particular target entity. One or more workflows may be automatically updated as new requirements are received by the system. Accordingly, the system may increase the efficiency of the supply chain by automatically providing multiple delivery packages based on a single source package. Additionally, the automated process may reduce the number of error-laden content provided by content providers (or other affiliated third-parties). When considered over a large number (and combination) of content providers, a large number media content provided (e.g., often received in real-time each day), and a variety of target entities (e.g., distribution services, geographic regions, etc.), the increased efficiency provided by a computer system of the present disclosure leads to a significant decrease in the overall amount of computing resources utilized. Embodiments of the present disclosure further enable content providers to deliver content to a variety of end-users (e.g., in different geographic regions, markets, etc.) faster than conventional techniques. By utilizing a standardized (e.g., automated) process for generating workflows for transforming input files, embodiments of the present disclosure may further allow for a more uniform and high-quality experience among end-users.

FIG. 1 is a block diagram illustrating a system 100 for generating media delivery packages for distribution to different target entities, in accordance with various embodiments. The system 100 includes multiple content providers, with content provider A 102, content provider B 104, and content provider C 106 being representative of many possible content providers. As discussed further herein, a content provider (e.g., content provider B 104) may generate a source package (e.g., source package N 108) that includes one or more source files (e.g., source media files). The system 100 further includes a computer system 112. The computer system 112 includes a media transformation service (MTS) 120 that may perform one or more functions, as described herein. The computer system 112 may receive a source package (e.g., the source package N 108) over a network 110 (e.g., the Internet or any suitable network). Upon receiving the source package, the MTS 120 may generate one or more media delivery packages by executing respective workflows, as discussed further herein. As depicted in FIG. 1, region D package 130, region E package 132, and region F package 134 collectively correspond to a representative number delivery packages of many possible generated delivery packages. Upon generating the delivery packages, the computer system 112 may provide (e.g., transmit) each package to one or more target entities. As depicted in FIG. 1, the computer system 112 transmits the region D package 130 to distribution service X 140, the region E package 132 to distribution service Y 142, and the region F package 134 to distribution service Z 144.

In some embodiments, a content provider may be any suitable entity that provides media contents for distribution to an end-user. Some non-limiting examples of a content provider may include a movie studio, a TV studio, an individual video blogger, a third-party service provider (e.g., performing post-processing of media contents on behalf of a movie studio), etc. In some embodiments, each content provider may produce a variety of types of media content. For example, a video blogger may produce a short video in English, and only intend to distribute the content to a U.S. audience via a distribution service focused primarily on U.S. end-users (e.g., distribution service X 140). In this example, the video blogger may wish to insert segments (e.g., of frames) within the short video that correspond to advertisements. In another example, a TV studio may stream a live feed of an event (e.g., a football game) to an audience, and then later want to make a video of the live feed available for audiences to watch post-event via video-on-demand (VOD) playback. In yet another example, a movie studio may produce a movie title and want to make the movie available in multiple geographic regions (e.g., the U.S., Japan, Germany, etc.), and/or via multiple platforms (e.g., distribution services X 140, Y 142, and Z 144). In an example where the content provider wants to make the media content available to multiple geographic regions, the content provider may produce multiple audio tracks and/or timed text for the media content in the appropriate language(s) for each geographic region. In some embodiments, as described further herein, the content provider may wish to further customize the media content based on one or more factors (e.g., the identity of the content provider, the particular type of media content, the particular target entity that receives the content). For example, a content provider may produce a particular branding logo for a video that indicates to the viewer that the media content is a promotional content. Also, in some embodiments, various content providers may produce and wish to distribute content on any suitable cadence. For example, the TV studio may want to distribute videos of live feeds in substantially real-time (e.g., as soon as the live feed ends). For example, a particular customer audience may have a high level of interest in watching clips (e.g., highlights) of a football game shortly after the game ends, but that interest level may quickly dissipate within the next several hours or days. Accordingly, the content provider may want to have highlights from the game published as soon as possible.

In some embodiments, as described above, for a given media content (e.g., a movie title, a VOD video, or any suitable AV content), a content provider may generate one or more media assets, depending on the particular goals of the content provider for that particular media content. In some embodiments, each media asset for the particular media content may correspond to a media source file (or "source file") and may have a predefined type of a set of predefined types. In some embodiments, the set of predefined types may include: (1) a video type (e.g., a mezzanine video), (2) an audio track type (e.g., an alternate audio track), (3) a timed text type (e.g., a forced narrative, caption, and/or subtitle), (4) an interstitial video type (e.g., a dub card, a placeholder frames for ad content, etc.), and (5) an image type (e.g., a branding logo). Each type may further include sub-types of source files. For example, one type of mezzanine may be a UHD HDR mezzanine, while another type of mezzanine may be a UHD Standard Dynamic Range (SDR) mezzanine. In some embodiments, a particular media content may have different alternate audio tracks per language (e.g., an English audio track, a Japanese audio track, etc.). In some embodiments, a timed text may correspond to a file that contains text associated with a portion of the media content, represented using any suitable format. In some embodiments, a forced narrative may correspond to a type of timed text (e.g., a subtitle) that translates the spoken dialog or text that isn't in the primary language of the video, and therefore provides a translation that is shown to all viewers regardless of whether captions are turned on or off. In some embodiments, a dub card may correspond to an interstitial video content (e.g., one or more frames) that lists voice actors who have played roles in the dubbing of an audio track for a video title. In some embodiments, a metadata file also be included within the source package, and may describe individual assets such as mezzanine files, timed text, images, etc. The metadata file may identify the type of file, and may include information about the file such as language, and/or may associate the file with the particular media content (e.g., a movie title). In some embodiments, images may be used for one or more purposes, including, for example, branding the video content, serving as a dub card, overlaying the image on a portion of the video to showcase a feature, etc.).

In some embodiments, network 110 may include any one or a combination of many different types of networks, such as cable networks, the Internet, wireless networks, cellular networks, and other private and/or public networks.

In some embodiments, computer system 112 may be a powerful computer or cluster of computers. For example, the server computer can be a large mainframe, a minicomputer cluster, or a group of servers functioning as a unit (e.g., providing a cloud-based service). In one example, the server computer may be a database server coupled to a Web server. The server computer may comprise one or more computational apparatuses and may use any of a variety of computing structures, arrangements, and compilations for servicing the requests from one or more client computers. Accordingly, it should be understood that embodiments of the present disclosure may be performed locally or remotely (e.g., in the cloud). In some embodiments, the MTS 120 may receive input from other sources beyond content providers. For example, the MTS 120 may receive input from third-parties (e.g., government entities, standards organizations, etc.). In some embodiments, the MTS 120 may receive updated requirements (e.g., business requirements) from third-parties, which may be used to generate one or more workflows, as described herein.

In some embodiments, each of the media delivery packages (e.g., region D package 130, region E package 132, and region F package 134) includes media assets (e.g., delivery files) required to present a media content (e.g., a movie title) for a particular target entity. As described herein, the MTS 120 may execute a workflow that transforms one or more of the source files from the source package (e.g., the source package N 108) into a set of delivery files of a delivery package. This set of delivery files may correspond to the assets (e.g., video content, audio tracks, timed text, metadata, etc.) needed for distribution to a particular target entity. It should be understood that a delivery package may contain any suitable composition and/or combination of transformed media source files from the source package. In some embodiments, a transformation may include executing one or more transformation modules of the MTS 120 to transform (e.g., modify) existing content (e.g., inserting video frames within video content, embedding audio tracks) within one or more source files. In some embodiments, a transformation may include selecting (or not selecting) a portion of the source files of the source package for inclusion within a delivery package, or even generating a new file (e.g., a new metadata file for a target entity).

In some embodiments, a target entity (e.g., distribution service X 140, distribution service Y, 142, distribution service Z 144, etc.) may be any suitable entity for which one or more delivery packages are intended for distribution. In some examples, as depicted in FIG. 1, a target entity may be a distribution service that hosts video content for customers to receive video content on-demand (e.g., video streaming). A distribution service may have its own particular distribution requirements that is different from other distribution services. For example, one distribution service may require that a 30-second block of black frames be inserted into video content (e.g., to make room for advertisements) on 5 minute intervals, while another distribution service may require that a 1 minute block of black frame be inserted on 10 minute intervals. In some examples, a target entity, as referenced herein, may include more than one sub-entity, and, accordingly, may have multiple types of requirements. For example, a distribution service (e.g., distribution service Y 142) may host video content that is available for streaming in certain geographic regions (e.g., countries such as Japan, Germany, the U.S., etc.). Each geographic region may have a particular format and/or standard for video content. Accordingly, in addition to the distribution service Y 142's own requirements, a delivery package may also be generated to be suitable for a particular region (e.g., or target market, or customer segment with a particular video preference, etc.) for which content is available from that distribution service. It should be understood then, that requirements for generating media assets for a particular delivery package may be based on requirements for one or more target entities (and/or sub-entities). It should be further understood that one or more delivery packages may be transmitted to a particular target entity for any given source package. For example, distribution service Y 142 may stream content in multiple languages to customers, and, accordingly, may receive delivery packages suited for multiple languages and/or geographic regions. In some embodiments, similar (e.g., the same) delivery packages may be delivered to target entities, for example, if different distribution services have the same format or standards requirements.

Figure 2:
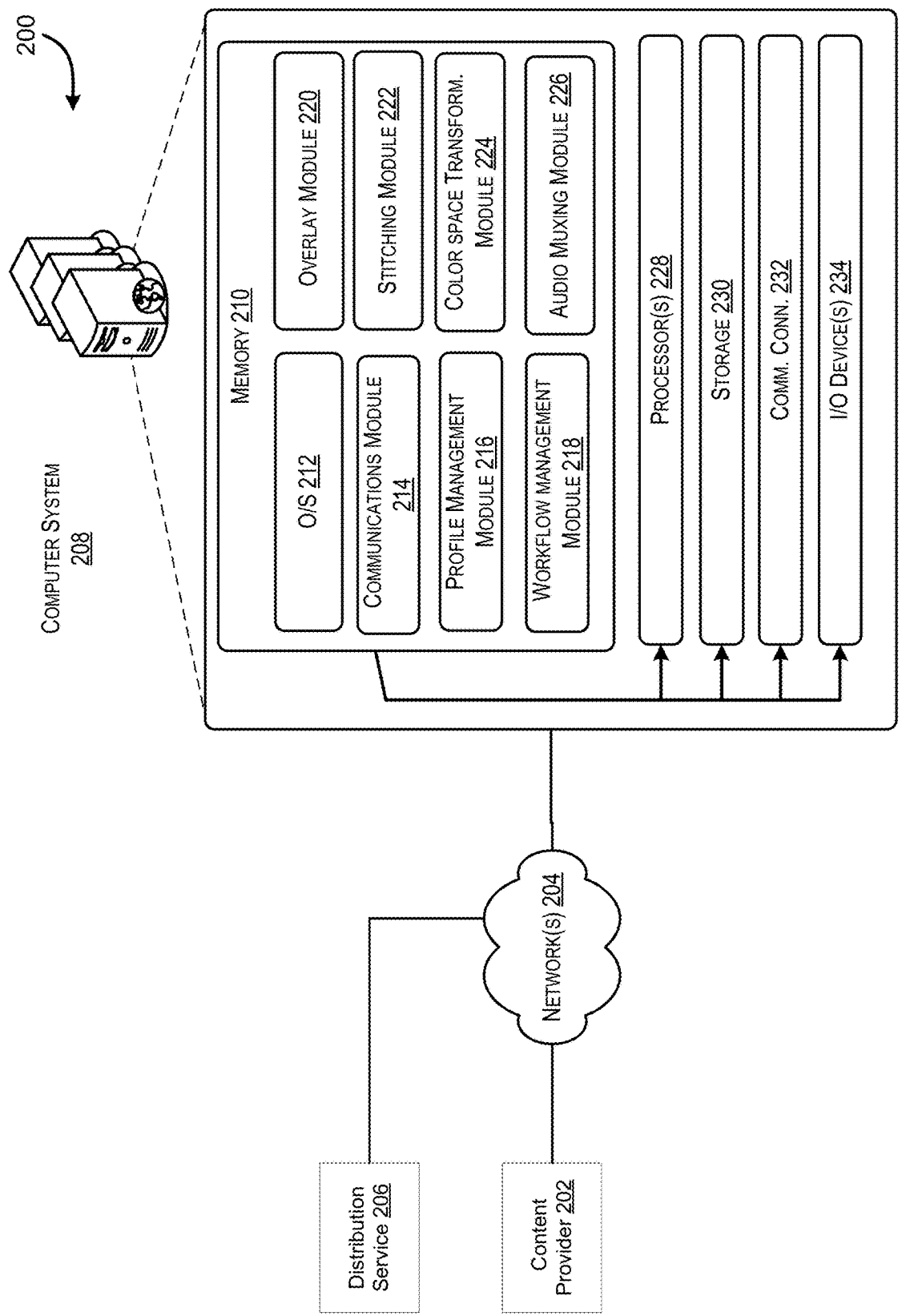
FIG. 2 illustrates an example architecture of a computer system to support generating media delivery packages, in accordance with various embodiments.

FIG. 2 illustrates an example architecture 200 for a computer system 208 generating media delivery packages, in accordance with various embodiments. In some embodiments, computer system 208 may be similar to computer system 112 of FIG. 1. As described in reference to FIG. 1, the computer system 208 may receive input (e.g., a source package) from a content provider 202, for example, over a network 204. Upon the computer system 208 generating one or more delivery packages based on the source package, the computer system 208 may provide the one or more delivery packages to the appropriate target entity(s) (e.g., distribution service 206).

Turning to the contents of the computer system 208 in more detail, the computer system 208 may comprise at least one memory 210, one or more processing units (or processor(s)) 228, a storage unit 230, a communication device 232, and an I/O device 234. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described.

The memory 210 may store program instructions that are loadable and executable on the processor(s) 228, as well as data generated during the execution of these programs. Depending on the configuration and type of the computer system 208, the memory 210 may be volatile (such as random access memory (RAM)) and/or non-volatile (such as read-only memory (ROM), flash memory, etc.). In some implementations, the memory 210 may include multiple different types of memory, such as static random access memory (SRAM), dynamic random access memory (DRAM) or ROM. The computer system 208 may also include additional storage 230, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices.

The computer system 208 may also contain communications connection(s) 232 that allow the computer system 208 to communicate with a stored database, another computing device or server, user terminals, and/or other devices on the network(s) 204. The computer system 208 may also include input/output (I/O) device(s) and/or ports 234, such as for enabling connection with a keyboard, a mouse, a pen, a voice input device, a touch input device, a display, speakers, a printer, etc.

Turning to the contents of the memory 210 in more detail, the memory 210 may include an operating system 212 and one or more application programs or services for implementing the features disclosed herein, including a communications module 214, a profile management module 216, a workflow management module 218, an overlay module 220, a stitching module 222, a color space transformation module 224, and an audio muxing module 226.

The operating system 212 may provide executable program instructions for the general administration and operation of that computer system 208 and typically will include a computer-readable storage medium (e.g., a hard disk, random access memory, read only memory, etc.) storing instructions that, when executed by a processor of the computer system 208, allow the computer system 208 to perform its intended functions. Suitable implementations for the operating system and general functionality of the servers are known or commercially available and are readily implemented by persons having ordinary skill in the art, particularly in light of the disclosure herein.

The communications module 214 may include code that causes the processor 228 to receive messages, generate messages, forward messages, reformat messages, and/or otherwise communicate with other entities. For example, the communications module 214 may receive source packages (e.g., a container of one or more media files), source manifests (e.g., an Extended Markup Language (XML) file), and/or profile information from a content provider. In some embodiments, upon generating one or more delivery packages, the communications module 214 may transmit the one or more delivery packages to one or more target entities (e.g., distribution service 206). In some embodiments, the communications module 214 may be responsible for generating a container (e.g., a zip file or any suitable container) for the generated media files for a delivery package.

The profile management module 216 may include code that causes the processor 228 to manage a delivery profile for a content provider. In some embodiments, the delivery profile may be used to determine instructions for generating delivery packages from a source package received from the content provider. For example, the delivery profile associated with the content provider may indicate a plurality of target entities (e.g., geographic regions, languages, distribution services, customer segments, etc.) for which the content item associated with the source package is intended for distribution. In some embodiments, the delivery profile may be generated prior to receiving the source package from the content provider. For example, the content provider may set up a delivery profile with the computer system 208, whereby any source packages subsequently received from the content provider may have delivery packages generated according to the delivery profile. In some embodiments, the delivery profile may be generated at the time of receiving the source package. For example, as described above, a source manifest may be received alongside (or within) the associated source package. The source manifest may contain instructions (or rules) for the generation of one or more delivery packages based on the associated source package. In another embodiment, a source manifest may be used to augment and/or update an existing delivery profile associated with a content provider. For example, a delivery profile may be initially created for content provider 202, which specifies that delivery packages for the German languages should be generated from a video content with English as an OV audio. At a later time, the computer system 208 may receive a source manifest from the content provider 202 that indicates that a particular algorithm (e.g., a parameter, described further herein) is to be used by the audio muxing module 226 when generating the delivery package for the German language.

The workflow management module 218 may include code that causes the processor 228 to generate one or more workflows. In some embodiments, a workflow defines parameters for an execution of one or more transformation modules (e.g., overlay module 220, stitching module 222, color space transformation module 224, and/or audio muxing module 226) to generate a delivery package. The one or more transformation modules, discussed further herein, may form a set of transformation modules of an MTS, whereby the particular set of transformation modules is sufficient to generate, from media source files of a single source package and each having a predefined type, a plurality of delivery packages. The plurality of delivery package may be suitable for distribution to one or more target entities. In some embodiments, the parameters for a given workflow may include determining at least one of: (1) a particular ordering of the execution of the one or more transformation modules, or (2) a particular input for each module of the one or more transformation modules. In an example of the first case, the parameters may determine that the stitching module 222 should execute multiple times to insert black video frames throughout the video content. In another example of the first case, the parameters may indicate that the overlay module 220 should be executed to overlay timed text prior to (or subsequent to) executing the audio muxing module 226 to embed audio content. In an example of the second case, the parameters may determine that the stitching module 222 should insert the black video frames at 10 minute intervals throughout the video. In another example of the second case, the parameters may determine that the stitching module 222 should execution a particular algorithm (e.g., of one or more possible algorithms) for performing a particular function (e.g., inserting black video frames). In yet another example of the second case, the parameters may include inputting the Japanese alternative audio track file instead of a German audio track file into the audio muxing module 226. It should be understood that any suitable input (e.g., duration, start time, end time, resolution, language, etc.) may be used for determining an execution of a transformation module.

In some embodiments, a different workflow (e.g., different ordering of execution of transformation modules, and/or different inputs) may be used to generate each delivery package of a set of delivery packages from a given source package. In some embodiments, a workflow (e.g., and/or workflow template) may be pre-generated even before receiving the source package. For example, the system may determine a delivery profile for a content provider, and then, based on the delivery profile, may generate one or more workflows. In one example, the workflows generated from the delivery profile may indicate that future media content (e.g., source packages) received from the content provider should be transformed into delivery packages for the German, Japanese, and English language. In some embodiments, a workflow may be dynamically generated and/or updated at the time of receiving a source package. For example, in some embodiments, parameters of a pre-existing workflow (e.g., or workflow template) may further include instructions to complete one or more other tasks. For example, the workflow may specify to check for an updated rules document (e.g., associated with legal compliance or other business rules) from a third party. The system may determine, based on the rules document, one or more inputs for executing one or more transformation modules. In at least this way, the system may enable a workflow to be dynamically updated, without requiring computer code to be re-programmed for the transformation modules. In some embodiments, as described above, the one or more workflows may be generated based on one or more inputs. For example, the one or more workflows may be generated based upon the contents of a source package. In this example, the workflow management module 218 may analyze the contents of the source package (e.g., metadata, audio files, the type of video mezzanine, etc.), determine what delivery packages should be generated based on the source package, and then determine one or more workflows for generating the delivery packages. In another example, the system may generate one or more workflows based upon the contents a pre-existing delivery profile and/or a source manifest that is associated with the source package. It should be understood that the system may utilize any suitable sources of inputs for generating the one or more workflows. Although, as described herein, a single workflow may be used to generate each delivery package, it should be understood that other embodiments are possible for performing embodiments of the present disclosure. For example, as described above, a single workflow template may be generated based on a delivery profile for a content provider. Then, upon later receiving a source package (and/or source manifest), one or more workflows may be generated from the single workflow template, each workflow suitable for generating a delivery package for a particular target entity. In some embodiments, a workflow may be represented using any suitable format (e.g., XML, JavaScript). In this way, the process for generating and/or updating a workflow may be simplified (e.g., modular), without requiring code recompilation, for example, to adjust inputs to a particular transformation module.

The overlay module 220 may include code that causes the processor 228 to overlay content on video content associated with a source package. In some embodiments, the overlay module 220 may overlay timed text (e.g., captions, subtitles, forced narratives) on a portion of the video content. The timed text may be overlaid to the video content in any suitable orientation (e.g., vertical, horizontal) and/or direction (e.g., left-to-right, or right-to-left). In some embodiments, the overlay module 220 may overlay one or more images on a portion of the video content. In some embodiments, the overlaying of timed text may involve burning the timed text (e.g., captions) directly into the imagery in each frame of video. In other embodiments, the timed text may not be burned into the frames, but overlaid via a suitable technique (e.g., layered on top of the frames). For clarity of illustration, the text and/or images may be overlaid over a given timecode range (e.g., spanning one or more video frames). The text and/or images may be overlaid with variable color, font, and/or transparency. In some embodiments, as described above, one or more parameters may be used as input to the overlay module 220 (e.g., a timed text file, image file(s), a timecode range, color, font, other metadata files, etc.). In some embodiments, a particular algorithm selection may be received as input for determining which algorithm should be executed by the overlay module 220 for performing a specific function. It should be understood that, in some cases, the selection of an algorithm (or any suitable input) may be included within a source package (e.g., a source manifest) or a predefined delivery profile. In some cases, the selection of an algorithm (or any suitable input) may be determined automatically by the system based at least in part on an analysis of media files within the source package. For example, upon being executed, the overlay module 220 may analyze the contrast ratio of the existing video content within the source package, and may then automatically determine an appropriate set of parameters (e.g., color, transparency) for overlaying timed text. In another example, the overlay module 220 may detect existing timed text (e.g., forced narratives) on a portion of the video content (e.g., near the bottom of the frames). In this case, the overlay module 220 may then determine that new timed text (e.g., captions) should be placed at the top of the frames, to avoid overlap. In some embodiments, the overlay module 220 may burn an image on a portion of a video frame. For example, the overlay module 220 may receive input data (e.g., based on the workflow being executed) that the branding for a video is out-of-date, and needs to be updated. As described above, this data may be received, for example, when the workflow executes a call to a third-party to determine if there are updated business rules and/or content that should be applied to the video. Upon receiving this input data, the overlay module 220 may burn a new branding (e.g., a logo image) on one or more frames of the video. In some embodiments, images may be overlaid one or more video frames for any suitable purpose and/or at any suitable location (e.g., overlaying an image on non-compliant content for a particular region).

The stitching module 222 may include code that causes the processor 228 to insert or remove interstitial video content (e.g., one or more video frames) at a location within the video. In some embodiments, the interstitial video content may correspond to any suitable content, including, but not limited to, placeholder frames (e.g., as a placeholder for advertisement video frames) and applicable ad cue points (e.g., to enable advertisement insertion), dub cards, etc. In some embodiments, the stitching module 222 may insert content (e.g., from the source package) within the video content based on parameters received from the workflow (e.g., a timecode range). In some embodiments, the stitching module 222 may receive parameters for removing interstitial content from a particular location within the video (e.g., removing commercial breaks). In one example, the stitching module 222 may execute an algorithm to automatically detect advertisements within the video, and then remove the advertisements. For example, the algorithm may detect a change in an audio or video pattern (e.g., a transition frame) that is indicative of a commercial break. In another example, the workflow may indicate (e.g., based on source manifest data) a timecode range that corresponds to a portion of the video that contains advertisements (and should be removed). It should be understood that, as described herein, interstitial content may be inserted or removed at any location within the video (e.g., adjacent to one or more frames of the video, such as at the beginning of the video frames, between frames of the video, or at the end of the video frames). In some embodiments, when inserting or removing interstitial content from a video file, the stitching module 222 may also adjust and/or insert delays for associated audio tracks and/or timed text files. For example, if an advertisement (e.g., a sequence of frames) is inserted at the beginning of the video content, the original (or alternate) embedded audio may be adjusted so that the audio begins at the new start of the video content. In some embodiments, the stitching module 222 may determine any adjustments (e.g., synchronization) to associated audio tracks and/or timed text based on parameters received from the workflow (e.g., based on contents within the source package and/or source manifest). In some embodiments, the stitching module 222 may automatically determine what adjustments are needed, for example, based in part on a mapping between encoded intervals of an audio track and intervals of a video (e.g., frames per second), as describe below. It should be understood that, in general, one or more transformation modules may be involved in performed a particular task (or sub-task). For example, the stitching module 222 may insert interstitial content, while the audio muxing module 2226 may be responsible for adjusting any audio based on the inserted interstitial content. As described above, the coordination (e.g., ordering) of particular modules may be defined within the workflow that is used to generate a delivery package.

The color space transformation module 224 may include code that causes the processor 228 to transform video content from a first color space to a second color space and/or from a first display resolution to a second display resolution. In some embodiments, a color space for a video content may correspond to a particular mapping of colors to digital values for each pixel (e.g., 16-bit pixels, 24-bit pixels) of a frame of video content. In one embodiment, an HDR mezzanine may be associated with a first color space, which may provide a relatively larger contrast and range of colors than an SDR mezzanine (e.g., more bits per pixel). The color space transformation module 224 may receive as input the HDR mezzanine and then transform the HDR mezzanine to an SDR mezzanine (i.e., a standard (e.g., lower) range of colors, using fewer bits per pixel). In some embodiments, the color space transformation module 224 may perform this transformation by using any suitable algorithm. For example, the system may receive input (e.g., from the content provider via a source manifest, from a third party source, etc.) that indicates a color mapping between HDR and SDR content. In another example, the source manifest may indicate one or more parameters (e.g., a non-linear transfer function, a tone mapping, etc.) for input to an algorithm executed by the color space transformation module 224. In some embodiments, the color space transformation module 224 may also perform a transformation from a first display resolution (e.g., UHD) to a second display resolution (HD). For example, the source package may contain a UHD HDR mezzanine. The color space transformation module 224 may transform the mezzanine to an HD SDR mezzanine (e.g., to create a VOD content that is suitable for streaming over the Web). In this example, the color space transformation module 224 may execute a compression algorithm to perform the compression (e.g., from UHD to HD). In some embodiments, the particular algorithm utilized may be determined as a parameter within the workflow used to generate the delivery package. As noted above, in some embodiments, the color space transformation module 224 may be executed in a particular ordering according to the parameters of the workflow (e.g., after other interstitial content has been inserted/removed, and/or other content has been overlaid).

The audio muxing module 226 may include code that causes the processor 228 to map an audio track to a video content. In some embodiments, a video may have an OV audio (e.g., English) that is included with the video file. Also, the source package may include one or more alternate audio tracks (e.g., Japanese, German, etc.). The audio muxing module 226 may be responsible for recombining (e.g., muxing) at least one of the alternate audio tracks with the video content. This process may be performed using any suitable candidate algorithm. For example, in one embodiment, the OV audio may be packaged within a container file package, whereby the individual video track and audio track remain distinct. In this case, the audio muxing module 226 may perform an algorithm that involves removing the OV audio track and repackaging the video file with the alternate audio track, so that the newly repackaged video file content contains the original video track and the alternate audio track. In another embodiment, the OV audio track may be embedded within the original video track. In this case, the audio muxing module 226 may perform another algorithm that involves decoding the original video file content (e.g., containing both the video track and the embedding audio track) into a raw format (e.g., not compressed). Then, the alternate audio track may be reencoded with the video track. As described herein, in some embodiments, the selection of a particular algorithm for performing the functions of the audio muxing module 226 may be indicated by a workflow (e.g., determined based on input from a source manifest received with the source package). In some embodiments, the system may automatically determine which algorithm to apply. In some embodiments, the audio muxing module 226 may be executed in coordination (e.g., via the workflow) with one or more other modules. For example, as described herein, in the case where the stitching module 222 inserts interstitial content (e.g., black video frames), the audio may need to be delayed and/or adjusted. In some embodiments, similar to as described above, the audio muxing module 226 may determine a mapping between intervals of an audio track and intervals of a video. In one example, the audio track may be encoded in a particular format that encodes in 1 second intervals, while the video content may display video frames at 30 frames per second. The audio muxing module 226 may segment different audio intervals (e.g., depending on how the audio was encoded), and reencode and/or resample the audio track so that the appropriate audio intervals begin and end at the appropriate times, based on the mapping to video content (e.g., and also taking into account inserted and/or removed video frames for the interstitial video content).

Figure 3:
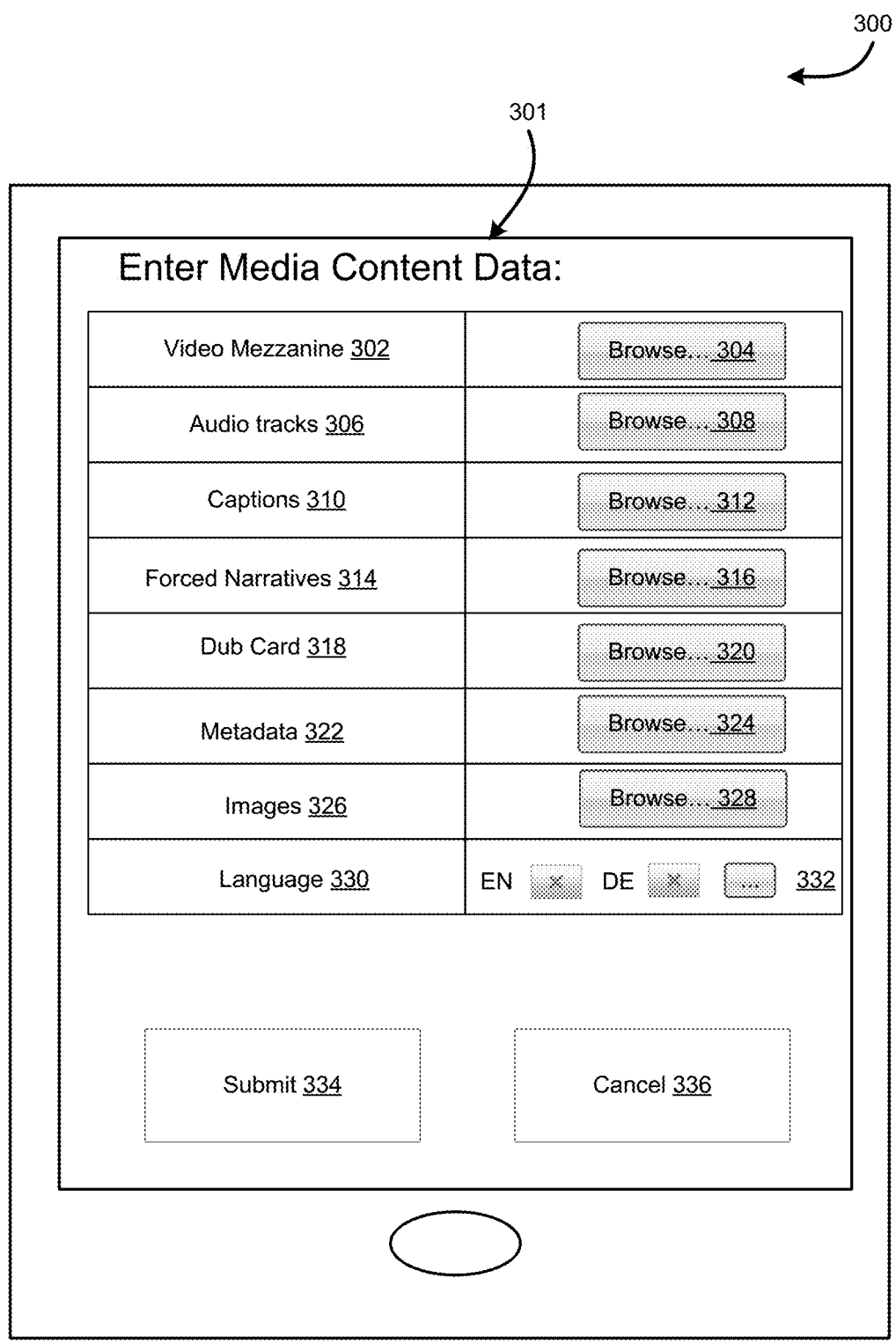
FIG. 3 illustrates an example graphical user interface (GUI) of a device that receives input for generating a media delivery package, in accordance with various embodiments.

FIG. 3 illustrates an example graphical user interface (GUI) 301 of a device 300 (e.g., a tablet, PC, or any suitable computing device) that receives input for generating a media delivery package, in accordance with various embodiments. In some embodiments, a content provider (e.g., content provider B 104 of FIG. 1) may input data into the device 300. The device 300 then packages the data (e.g., files) and generates a source package, which is then transmitted to a computer system (e.g., computer system 112 of FIG. 1 or computer system 208 of FIG. 2) to be used in generating one or more delivery packages.

In the embodiment illustrated by FIG. 3, the GUI 301 presents multiple fields (e.g., 302, 306, 310, 314, 318, 322, 326). Each field represents a type (or sub-type) of media content that may be received by the device 300. Next to each field is a respective button (e.g., 304, 308, 312, 316, 320, 324, 328 that allows the user to "Browse" and select one or more files for the particular type of media content. It should be understood GUI 301 presents one illustration for types (or sub-types) of content that may be input for generating a source package. In some embodiments, other sub-types may also be available for presentation. For example, although captions 310 represent a sub-type of the timed text type (e.g., a transcription of a dialogue of the video content), subtitles may also be another sub-type of timed text (e.g., a translation of the dialogue). Also, forced narratives 314 may also represented another sub-type of timed text. In some embodiments, files for each of these sub-types may be separately generated and/or organized with the source package so that the computer system may determine which files to use as input for one or more transformation modules. The computer system may also use particular file organization (e.g., file names and/or hierarchical layout within the source package) to determine a workflow. Also, in some embodiments, sub-types may be indicated in another screen (not shown). For example, the content provider may click "Browse" 304 to input a video mezzanine. After selecting "Browse" 304, the user may be presented with other options to select (e.g., UHD HDR mezzanine sub-type, UHD SDR mezzanine sub-type, etc). Accordingly, the user may input multiple files for a given type. For example, upon clicking Browse 308, the user may be able to input different alternate audio track files for different languages (e.g., German, Japanese, etc.), whereby the user may select which language a particular file is associated with. For example, the user may input a dub card 318 in only German language, while they may input forced narratives 314 for German, Japanese, and English.

As depicted in FIG. 3, the GUI 301 may enable the content provider to select one or more business requirements. For example, the content provider may select one or more languages 330 for which delivery packages should be generated. This is indicated in FIG. 3 by language selection buttons 332 (e.g., EN, DE, etc.). It should be understood that the GUI may enable any suitable business requirements to be received by the device 300. For example, the user may select one or more target distribution services that should receive one or more of the generated delivery packages. In another example, the user may identify that the video content should have advertisements removed (or inserted) from the existing video content. In a case where advertisements should be inserted, the GUI 301 may provide a form where the user may input parameters for the advertisements (e.g., "insert advertisement every 5 minutes"). In some embodiments, as described herein, these business requirements may be included within a source manifest and transmitted to the computer system. The computer system may then utilize the source package and/or source manifest to generate one or more workflows, for example, using the parameters indicated by the source manifest. It should be understood that, in some cases, the computer system may be able to automatically determine lower-level parameters (e.g., how often to insert black frames for advertisements) based on a higher-level parameter (e.g., a particular target distribution service). Also, as described herein, in some cases, the computer system may already maintain a delivery profile for the content provider, which includes one or more business requirements of the content provider. For example, in a case where the computer system receives video content from the content provider on a regular cadence (e.g., from sports events live feeds each day), the profile may already indicate parameters for transforming the source files from source packages received. In this case, the GUI 301 may be simplified to only enable the content provider to input source files associated with the media content. Also, in some embodiments, the content provider (e.g., a computer service of the content provider) may automatically generate source packages from newly released content. Continuing with the example of FIG. 3, once content provider has input the appropriate data, they may click "Submit" 334 (or Cancel 336, to restart the process) to generate the source package and/or source manifest, and transmit to the computer system.

Figure 4:
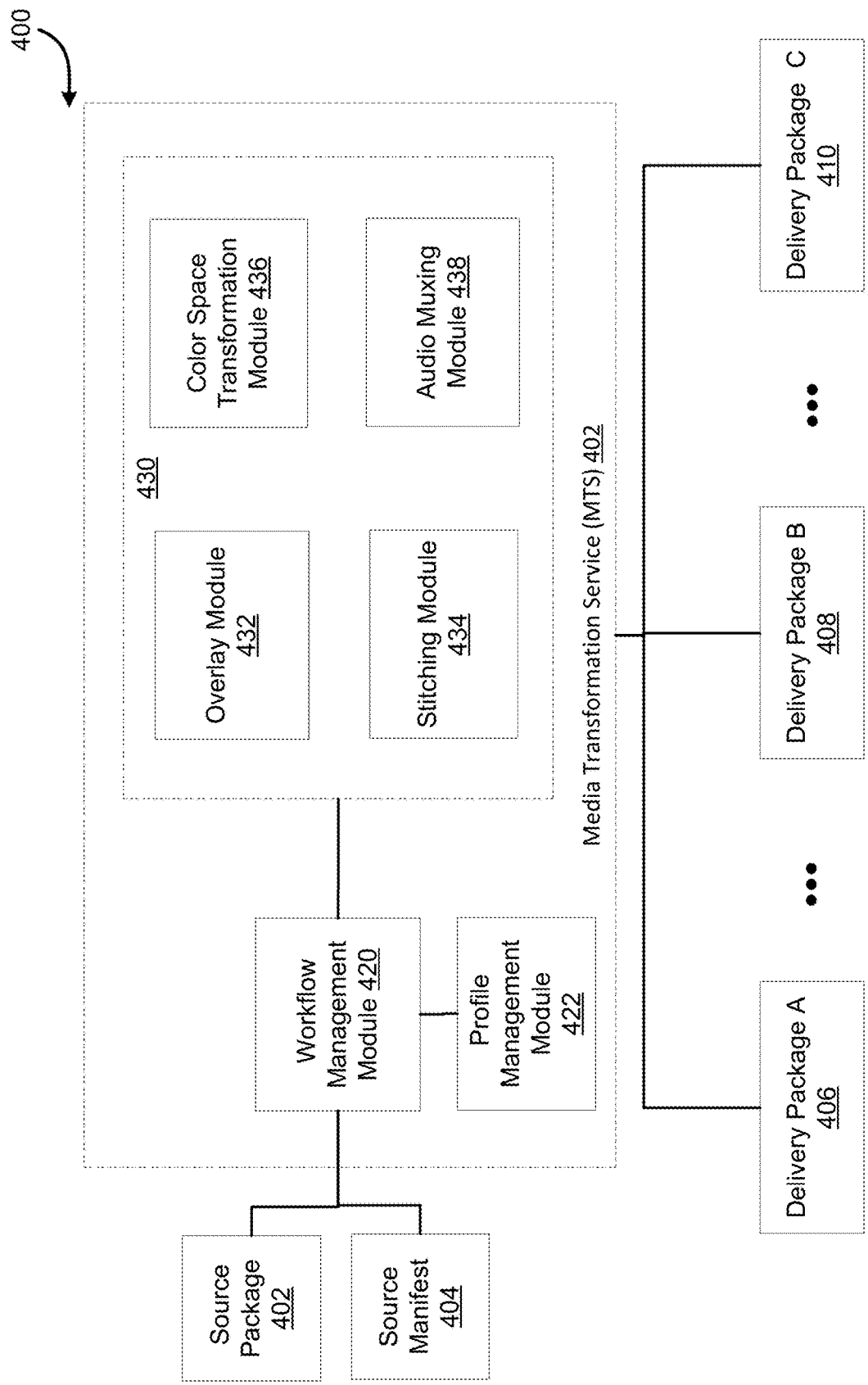
FIG. 4 is a data flow diagram illustrating an example media transformation performed by a computer system to generate media delivery packages, in accordance with various embodiments.

FIG. 4 illustrates an example media transformation flow performed by a computer system to generate a media delivery package, in accordance with various embodiments. The architecture 400 of FIG. 4 includes an MTS 402, which may be similar to MTS 120 of FIG. 1. As depicted in FIG. 4, the MTS 402 includes a set of four transformation modules 430. In some embodiments, each of these modules respectively corresponds to one or more of the modules of computer system 208 of FIG. 2. Additionally, the MTS 402 includes a workflow management module 420 and a profile management module 422, which may, respectively correspond to workflow management module 218 and profile management module 216 of FIG. 2.

In some embodiments, the media transformation flow proceeds whereby the MTS 402 receives a source package 402 from a device of a content provider (e.g., device 300 of FIG. 3). In some embodiments, an optional source manifest 404 may be transmitted alongside the source package 402. Upon receiving the source package 402, the workflow management module 420 may generate one or more workflows. For example, the workflow management module 420 may analyze media source files within the source package to determine parameters for executing one or more of the transformation workflows (e.g., an ordering of execution, inputs for execution of each module, etc.). In some embodiments, each workflow generated by the workflow management module may be executed to generate a respective delivery package, with delivery package A 406, delivery package B 408, and delivery package C 410 corresponding to representative delivery packages. In some embodiments, these delivery packages may be similar to delivery packages 130, 132, and 134 of FIG. 1. In some embodiments, as described above, the workflow management module 420 may optionally utilize the source manifest 404 to determine one or more workflows. In some embodiments, the workflow management module 420 may further interface with the profile management module 422. For example, the workflow management module 420 may determine if a preexisting delivery profile of the content provider associated with the source package 402 exists. If so, the workflow management module 420 may determine a workflow based at least in part on the delivery profile. Any suitable subset and/or combination of the source package 402, the source manifest 404, and or/a preexisting delivery profile maintained by the profile management module 422 may be suitable for use in generating one or more workflows.

As described above in reference to FIG. 3, it should be understood that the particular set of transformation modules 430 may be suitable for generating a set of delivery packages from a single source package that includes source files of a predefined type. The set of predefined types of source files may be selected as being a minimal (but sufficient) set, such that, when used as input for transformation by one or more modules of the particular set of transformation modules, the MTS 402 may generate the set of delivery packages that meet the requirements of one or more target entities (e.g., a variety of distribution services, geographic regions, customer segments, etc.).

Figure 5:
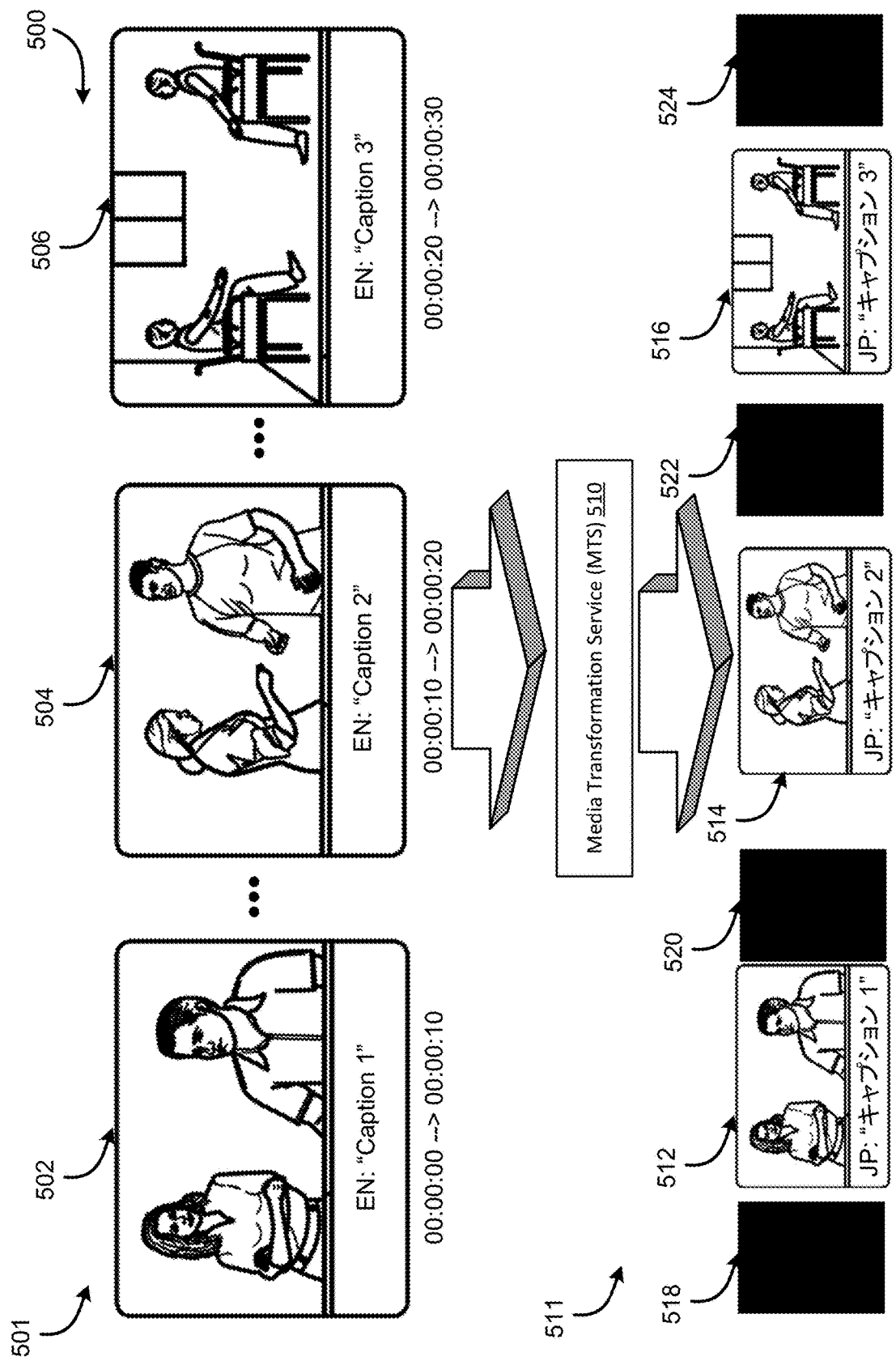
FIG. 5 illustrates an example technique for generating a media delivery package, in accordance with various embodiments.

FIG. 5 is a block diagram 500 that illustrates an example process for transforming media content included within a source package to generate a media delivery package. In FIG. 5, an original video content 501 is depicted (e.g., video content included within the source package). The original video content 501 includes a sequence of frames. In one example, the original video content 501 (e.g., a UHD HDR content) includes an embedded OV audio in English. In one example, the video content 501 with OV audio may be included within a mezzanine file (e.g., ProRes format within an MP4 container). It should be understood that any suitable video format and/or container (e.g., Material Exchange Format (MXF), MPV, etc.) may be used for embodiments of this disclosure. Additionally, a set of captions (or subtitles) may be included within a timed text file that is associated with the original video content 501. As depicted, the captions may be partitioned according to different time intervals (e.g., 10 second intervals). Accordingly, "Caption 1" (e.g., in English) may represent the captions for the time interval between 0 and 10 seconds, "Caption 2" may represent the captions for the time interval between 10 and 20 seconds, and "Caption 3" may represent the captions for the time interval between 20 and 30 seconds. Depending on the frame rate (e.g., 30 frames per second), one or more frames of the sequence of frames may be associated with each time interval. For example, frame group 502 may represent a group of frames that are displayed within the time interval between 0 and 10 seconds, and similar for frame groups 504 and 506. In this example, the original video content 501 may correspond to a movie title, and may not have any commercial breaks interspersed within the original video 501.

In some embodiments, beyond the original video content 501 with OV audio that is included within a mezzanine file, additional files may also be generated and associated with the original video content 501. For example, a Japanese audio track (e.g., included in an MP4 container) may be created. Also, a corresponding timed text file with Japanese captions (e.g., or other timed text, such as forced narratives, captions, etc.) may be created. These one or more media files may be included within a source package, as described herein. Also, beyond additional media content, in some embodiments, the content provider associated with the original video content 501 may have one or more business requirements. For example, the content provider may wish to distribute the content to a target entity (e.g., a distribution service) for VOD streaming of the video in Japanese. In this example, the distribution service may require that advertisement cue points are inserted, along with black frames for the portion of time that each advertisement (e.g., commercial) is intended to run. These business requirements may be included within a source manifest (and/or delivery profile).

In some embodiments, an MTS 510 may receive the source package of the content provider along with the source manifest. In some embodiments, the MTS 510 may be similar to MTS 120 of FIG. 1 and/or MTS 402 of FIG. 4. The MTS 510 may then generate a workflow for transforming media files from the source package in a plurality of delivery media files of a delivery package. The delivery package includes transformed media content 511, according to the parameters specified by the workflow. Continuing with the example from above, the workflow may define several parameters for an execution of the one or more transformation modules of the MTS 510. For example, the workflow may define a parameter that includes executing an overlay module to overlay Japanese timed text on the original video content 501 (e.g., replacing the English timed text). The Japanese timed text may be overlaid (e.g., burned in to the frames) for corresponding frame groups. As depicted in FIG. 5, a frame group 512 corresponds to the frame group 502, a frame group 514 corresponds to the frame group 504, and a frame group 516 corresponds to the frame group 506. The workflow may further define a parameter that includes executing a stitching module to insert a plurality of black (e.g., or other placeholder) frames at one or more locations within the original video content 501. As depicted in FIG. 5, four sets of black frames are illustrated (e.g., set 518, set 514, set 522, and set 524). In some embodiments, instead of black frames, any suitable content may be inserted (e.g., commercial ads, etc.). The workflow may further define a parameter that includes executing a color space transformation module to transform the original video content 501 from UHD HDR to UHD (or HD) SDR for inclusion within a new mezzanine file as the transformed media content 511. This is depicted in FIG. 5 as each set of frames is reduced in size from the original size, indicating a reduced number of bits per pixel and/or a re-sampling from the previous color space range to a new color space range. The workflow may further define a parameter that includes executing an audio muxing module to map a Japanese audio track to the transformed media content 511. For example, in a case where the original mezzanine contained a separate video track and English audio track, the audio muxing module may swap the English audio track for the Japanese audio track. The module may further adjust and/or delay the audio timings based on the transformations made via other modules (e.g., adjusting for the black frames inserted by the stitching module). The workflow may further include a parameter (e.g., a rule) that includes checking for updated requirements (e.g., updated legal compliance requirements) from another source (e.g., a third party, a database affiliated with the system, etc.), for example to download a document (e.g., XML) containing those requirements. In an example, the document may indicate that certain imagery and/or scenes should not be displayed for the particular region (e.g., Japan). Accordingly, the workflow may define another parameter that includes executing the overlay module to overlay an image (e.g., a black-out image) on a portion of a frame(s) that should not be displayed. In another embodiment, the portion may be blurred out or otherwise distorted.

Figure 6:
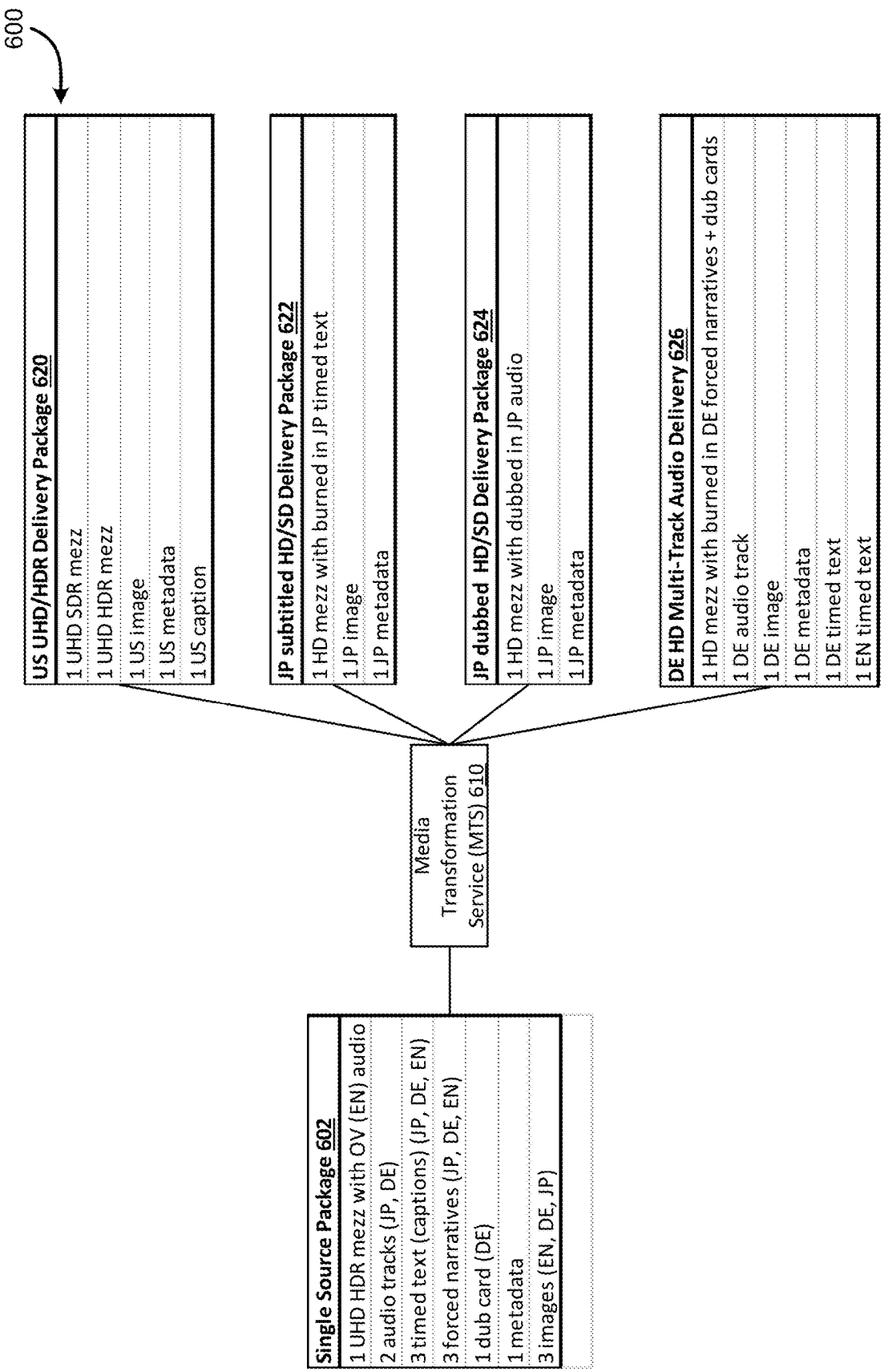
FIG. 6 illustrates another example technique for generating a media delivery package, in accordance with various embodiments.

Although the example above describes a possible workflow that may be used to generate a delivery package, it should be understood that multiple workflows may be determined for generating multiple delivery packages, as depicted further herein with respect to FIG. 6. Each workflow may be determined based on different requirements (e.g., business requirements, legal requirements, regional requirements, language-specific requirements, etc.). Each delivery package may have a different combination of media files and/or different content within each media file. The types, number, and contents of files within a particular delivery package may be determined based on the workflow, and may be generated based on the execution of transformation modules of the MTS 510 according to the particular parameters of the respective workflow.

FIG. 6 illustrates an example flow for generating media delivery packages, in accordance with various embodiments. In block diagram 600 of FIG. 6, a single source package 602 is depicted, which may be similar to source package N 108 of FIG. 1. Also, an MTS 610 is depicted, which may be similar to any MTS as discussed in reference to any of the figures described herein. Also, multiple representative delivery packages are depicted, including delivery package 620, 622, 624, and 626. Each delivery package may include different files and/or different content within each file. In some embodiments each delivery package may have a different nomenclature (e.g., different file names), for disambiguation and inventory management.

As depicted, the single source package 602 contains different types (and/or sub-types) of files. For example, a video file corresponding to a UHD HDR mezzanine with OV audio (e.g., English) is included. In another example of a different file type, 2 audio tracks (e.g., Japanese and German) are included. The source package 602 also includes, for one or more languages per type of file, timed text files (e.g., captions), forced narrative files, dub card video files, a metadata file, and multiple images. As described herein, it should be understood that this particular set of file types may be suitable for generating a required set of delivery packages based on the set of transformation modules of the MTS 610. In particular, as described herein, the MTS 610 may generate a suitable workflow for generating each of the delivery packages 620, 622, 624, and 626. It should be understood that, although three languages (e.g., English, German, and Japanese) are depicted in FIG. 6, and any suitable number of languages may be included within source packages and/or delivery packages.

Tables 1 and 2, illustrated below, provide another illustration of how a single source package (see Table 1) may be used by an MTS to generate multiple types of delivery packages (see Table 2).

TABLE 1

| | |
|---|---|
| Single Source Package | 1 UHD HDR mezz with OV audio |
| | 7 audio tracks (P1 languages) |
| | 8 timed text (captions) (P1 languages plus OV) |
| | 8 forced narratives (P1 languages plus OV) |
| | 1 dub card (DE) |
| | 1 metadata (includes 8 P1 languages in single file) |
| | 3 images (EN, DE, JP) |

TABLE 2

| Delivery Package # | Territory | Description | Assets (Files) included in each Delivery Package |
|---|---|---|---|
| 1 | US | US HD/SD delivery | 1 HD mezz<br>1 US image<br>1 US metadata<br>1 US caption |
| 2 | US | US UHD/HDR delivery | 1 UHD SDR mezz<br>1 UHD HDR mezz<br>1 US image<br>1 US metadata<br>1 US caption |
| 3 | GB | GB HD/SD delivery | 1 HD mezz<br>1 GB image<br>1 GB metadata<br>1 GB caption |
| 4 | GB | GB UHD/HDR delivery | 1 UHD SDR mezz<br>1 UHD HDR mezz<br>1 GB image<br>1 GB metadata<br>1 GB caption |
| 5 | JP | JP subtitled HD/SD delivery | 1 HD mezz with burned in JP timed text<br>1 JP image<br>1 JP metadata |
| 6 | JP | JP dubbed HD/SD delivery | 1 HD mezz with dubbed in JP audio<br>1 JP image<br>1 JP metadata |
| 7 | JP | JP subtitled UHD/HDR delivery | 1 UHD SDR mezz with burned in JP timed text<br>1 UHD HDR mezz with burned in JP timed text<br>1 JP image<br>1 JP metadata |
| 8 | JP | JP dubbed UHD/HDR delivery | 1 UHD SDR mezz with dubbed in JP audio<br>1 UHD HDR mezz with dubbed in JP audio<br>1 JP image<br>1 JP metadata |
| 9 | DE | DE HD Multi-Track Audio delivery | 1 HD mezz with burned in DE forced narratives + dub cards<br>1 DE audio track<br>1 DE image<br>1 DE metadata<br>1 DE timed text<br>1 EN timed text |
| 10 | DE | DE UHD/HDR dubbed delivery | 1 UHD SDR mezz with dubbed DE audio<br>1 UHD HDR mezz with dubbed DE audio<br>1 DE image<br>1 DE metadata<br>1 DE timed text<br>1 EN timed text |
| 11 | DE | DE UHD/HDR OV delivery | 1 UHD SDR mezz with OV audio<br>1 UHD HDR mezz with OV audio<br>1 DE image<br>1 DE metadata<br>1 DE timed text<br>1 EN timed text |

TABLE 2-continued

| Delivery Package # | Territory | Description | Assets (Files) included in each Delivery Package |
|---|---|---|---|
| 12 | ROW | UHD/HDR Rest of World delivery | 1 UHD SDR mezz with OV audio<br>1 UHD HDR mezz with OV audio<br>7 audio tracks (P1 languages)<br>8 timed text (P1 languages plus OV)<br>8 forced narratives (P1 languages plus OV)<br>1 metadata<br>1 image |
| 13 | IN (India) | UHD/HDR IN delivery | 1 UHD SDR mezz with OV audio<br>1 UHD HDR mezz with OV audio<br>1 IN audio<br>2 timed text (OV + IN)<br>2 forced narratives (OV + IN)<br>1 metadata<br>1 image |

Figure 7:
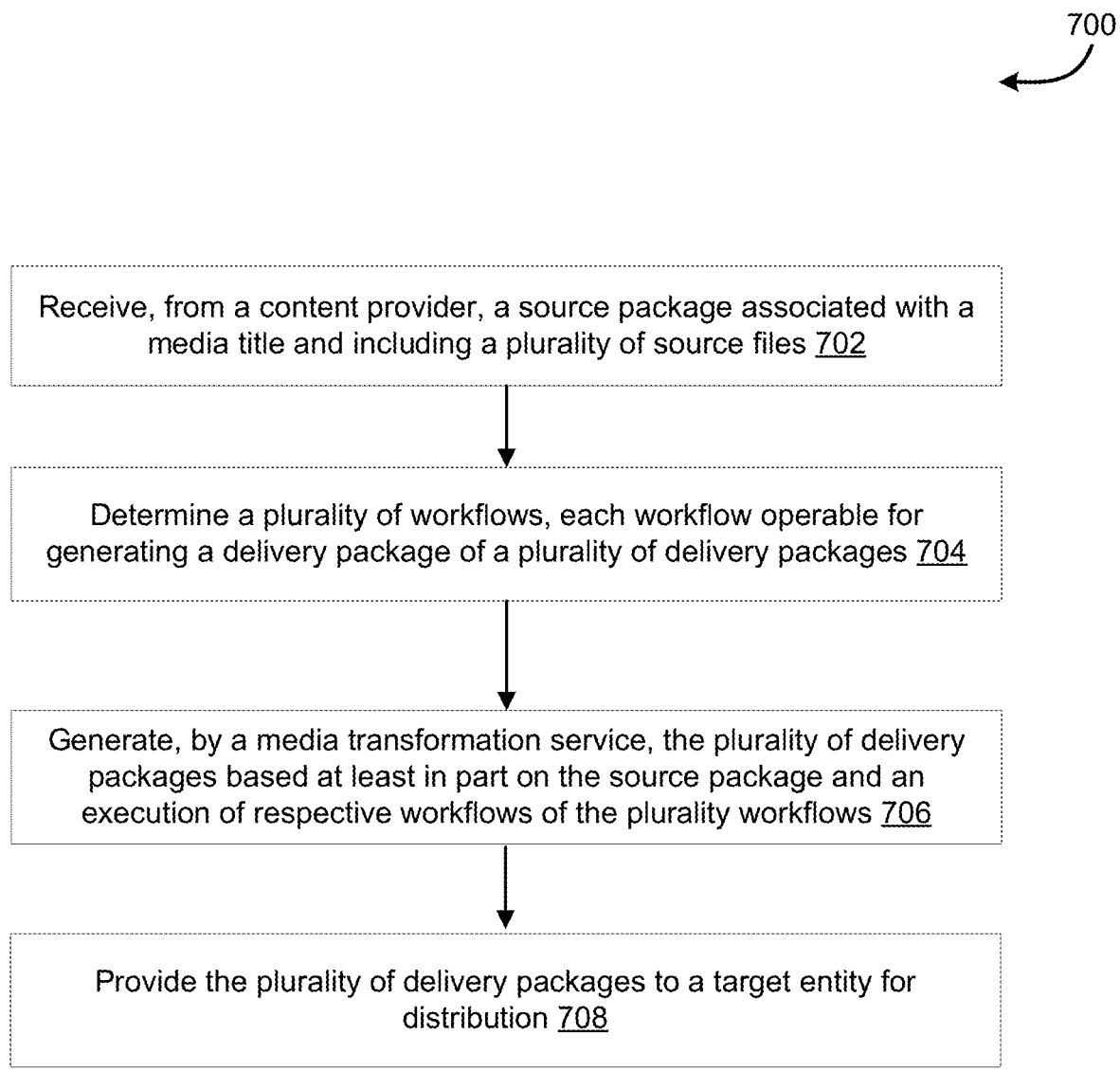
FIG. 7 illustrates an example method for generating a media delivery package, in accordance with various embodiments.

FIG. 7 illustrates an example flow for generating a plurality of media delivery packages based on a single source package, in accordance with various embodiments. In some embodiments, the system of FIGS. 7 and 8 may correspond to system 112 of FIG. 1 and/or system 208 of FIG. 2. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 702, the system may receive, from a content provider, a source package associated with a content item (e.g., a movie) and including a plurality of source files. In some embodiments, each source file may have a type of a set of predefined types (e.g., a video type, an audio track type, a timed text type, an interstitial video type, an image type, and/or a metadata type). In some embodiments, one or more of the files of a given type may be associated with a particular language, region, market, etc. For example, a source package may contain multiple alternate audio track files, each file associated with a different language. In some embodiments, the system may optionally receive a source manifest alongside (or within) the source package. The source manifest may include instructions (e.g., rules) for generating one or more workflows for generating delivery packages, described below. In some embodiments, the system may also optionally receive information (e.g., prior to receiving the source package) for determining a delivery profile of the content provider. As described herein, the delivery profile may correspond to business requirements (e.g., target regions, languages, markets) for the content provider regarding one or more media contents.

At block 704, the system may determine a plurality of workflows, each workflow operable for generating a delivery package of a plurality of delivery packages. In some embodiments, a workflow of the plurality of workflows defines parameters for an execution of one or more transformation modules of a set of transformation modules of an MTS of the system. The workflow may indicate at least one of: (1) a particular ordering of the execution of the one or more transformation modules, or (2) a particular input (e.g., one of the source files of the source package, a selection of an algorithm, etc.) for each module of the one or more transformation modules. In some embodiments, the plurality of workflows may be determined based one or more of the source package, the source manifest, or the delivery profile of the content provider. In some embodiments, each delivery package may include a plurality of delivery files and may be intended for a target entity of a plurality of target entities. For example, a target may correspond to a distribution service. In another example, a target entity may correspond to a particular language, region, marketplace, or customer segment. In some embodiments, a delivery package may be generated to satisfy requirements for multiple sub-entities of a target entity. For example, a delivery package may be intended to be distributed by a particular distribution service for distribution in a certain region (e.g., Japan) and in a particular language (e.g., Japanese). Accordingly, the delivery package may be generated to account for requirements, not only of the particular distribution service (e.g., formatting standards, etc.), but also language and/or other regional requirements.

At block 706, the MTS of the system may generate the plurality of delivery packages based at least in part on the source package and the execution of respective workflows of the plurality workflows. The MTS may execute each workflow to transform one or more source files of the source package into a plurality of delivery files for a respective delivery package of the plurality of delivery packages. In some embodiments, the specific set of predefined types of source files, when input into the specific set of transformation modules of the MTS, may be operable for generating delivery packages suitable for any one of the plurality of target entities.

At block 708, the system may provide the plurality of delivery packages to a target entity for distribution. For example, the system may provide the plurality of delivery packages associated with the movie title (e.g., associated with the received source package) to a distribution service. The plurality of delivery packages may respectively correspond to various languages for which the movie title has dubbed and/or subtitled content. In some embodiments, the system may provide the same delivery package to more than one target entity, for example, if the target entity has similar distribution requirements (e.g., the same formatting standards). It should be understood that any suitable combination of delivery packages may be provided to one or more target entities, based on the requirements for each target entity and/or other requirements (e.g., determined by the content provider).

Figure 8:
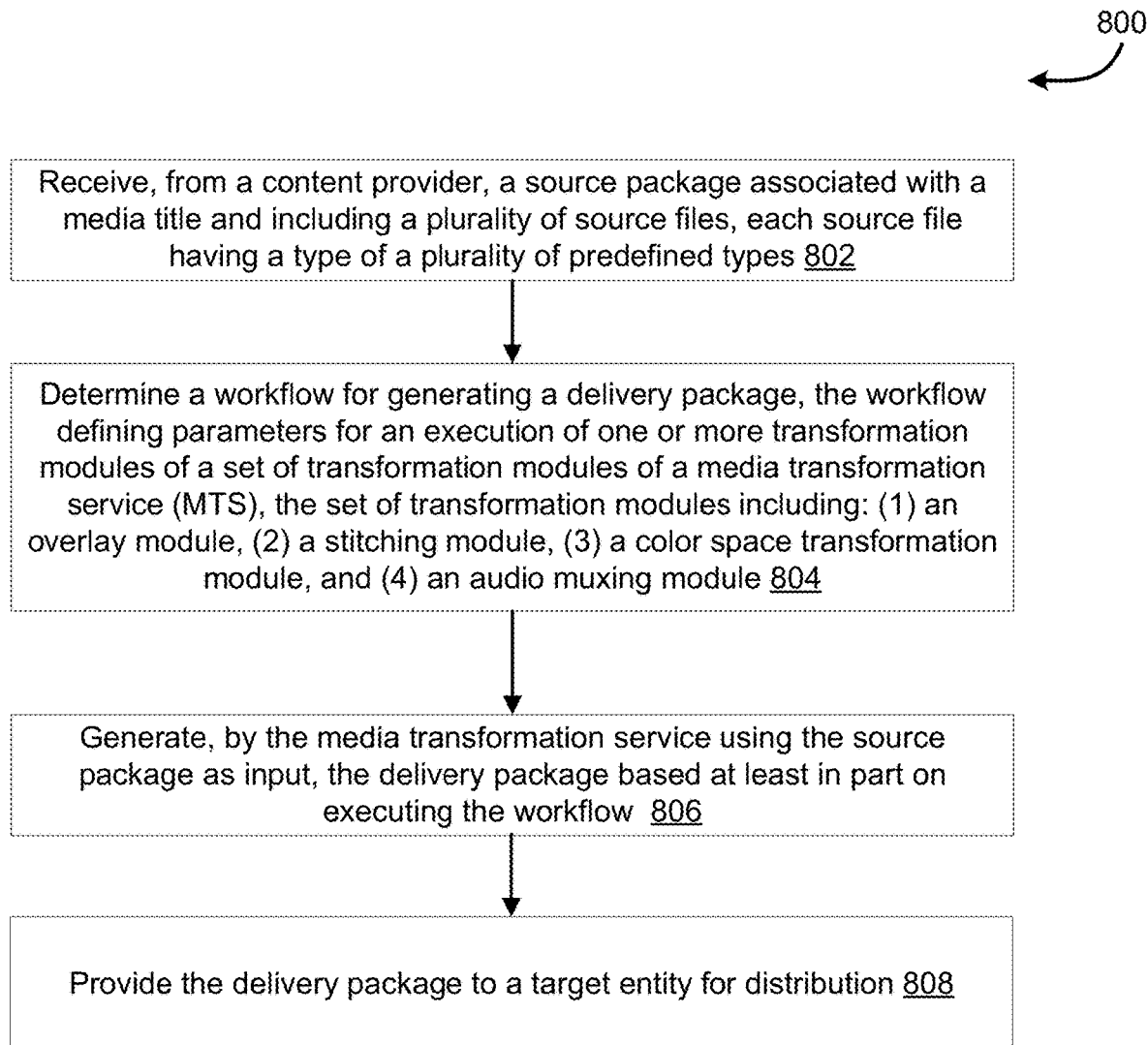
FIG. 8 illustrates another example method for generating a media delivery package, in accordance with various embodiments.

FIG. 8 illustrates an example flow for generating a delivery package based on a single source package, in accordance with various embodiments.

At block 802, the system may receive, from a content provider, a source package associated with a content item and including a plurality of source files. Each source file may have a type of a plurality of predefined types. In some embodiments, the plurality of types may include (1) a video type (e.g., including an OV audio track), (2) an audio track type (e.g., an alternate audio track), (3) a timed text type, (4) an interstitial video type, and (5) an image type. In some embodiments, one or more of the operations of block 802 may be similar to one or more of the operations of block 702 of FIG. 7.

At block 804, the system may determine a workflow for generating a delivery package. The workflow may define parameters for an execution of one or more transformation modules of a set of transformation modules of an MTS. In some embodiments, one or more of the operations of block 804 may be similar to one or more of the operations of block 704 of FIG. 7.

At block 806, the system may generate, by the MTS, the delivery package based at least in part on executing the one or more transformation modules. In some embodiments, the set of transformation modules of the MTS may include: (1) an overlay module, (2) a stitching module, (3) a color space transformation module, and (4) an audio muxing module. The overlay module may overlay timed text and/or image content on a video file content of the video type that is one of the source files of the source package. The stitching module may insert interstitial video content of the interstitial video type at a location with the video content, or remove another interstitial video content from the video content. The color space transformation module may perform at least one of transforming the video content from a first color space to a second color space, or transforming the video from a first display resolution to a second display resolution. The audio muxing module may map an audio track (e.g., an alternate audio track of the audio track type) to the video content. As described herein, the one or more modules may be used to perform different kinds of transformations on source files of the source package. In some non-limiting examples of use cases, the overlay module may be used to overlay portions of video frames with image content to cover sensitive content (e.g., to meet legal compliance guidelines for a region). In another example, the overlay module may be used to update branding information, for example, by overlaying a logo image on one or more video frames. In another example, the overlay module may burn timed text (e.g., captions, subtitles, and/or forced narratives) into a mezzanine file (e.g., with vertical or horizontal orientation). In another example, the stitching module may insert interstitial video content, such as placeholder frames and associated advertisement cue points. In another example, the stitching module may update one or more video frames for branding purposes, or to insert an advertisement. In yet another example, a dub card may be stitched to the end of a mezzanine file to meet the requirements of a particular region. In some embodiments, the interstitial video content may be inserted in any suitable location that is adjacent to at least one frame of the video content (e.g., at the beginning, end, or somewhere in between two of the video frames of the original video content). In another example, the color space transformation module may transform an HDR video into an SDR video file. In another example, the audio muxing module may swap embedded audio tracks in a mezzanine file for alternate audio tracks. In another example, the audio muxing module may add silence to the beginning or the end of an audio track file, for example, when the audio is out of sync with the mezzanine file (e.g., due to the audio track not accounting for interstitial video content previously inserted into the video).

At block 808, the system may provide the delivery package to a target entity for distribution. In some embodiments, one or more of the operations of block 808 may be similar to one or more of the operations of block 708 of FIG. 7. For example, although only one delivery package is described in this flow, it should be understood that any suitable number and/or type of delivery packages may be generated, for example, as illustrated in reference to FIGS. 5 and 6. Additionally, the one or more delivery packages may be provided to one or more target entities for distribution.

Figure 9:
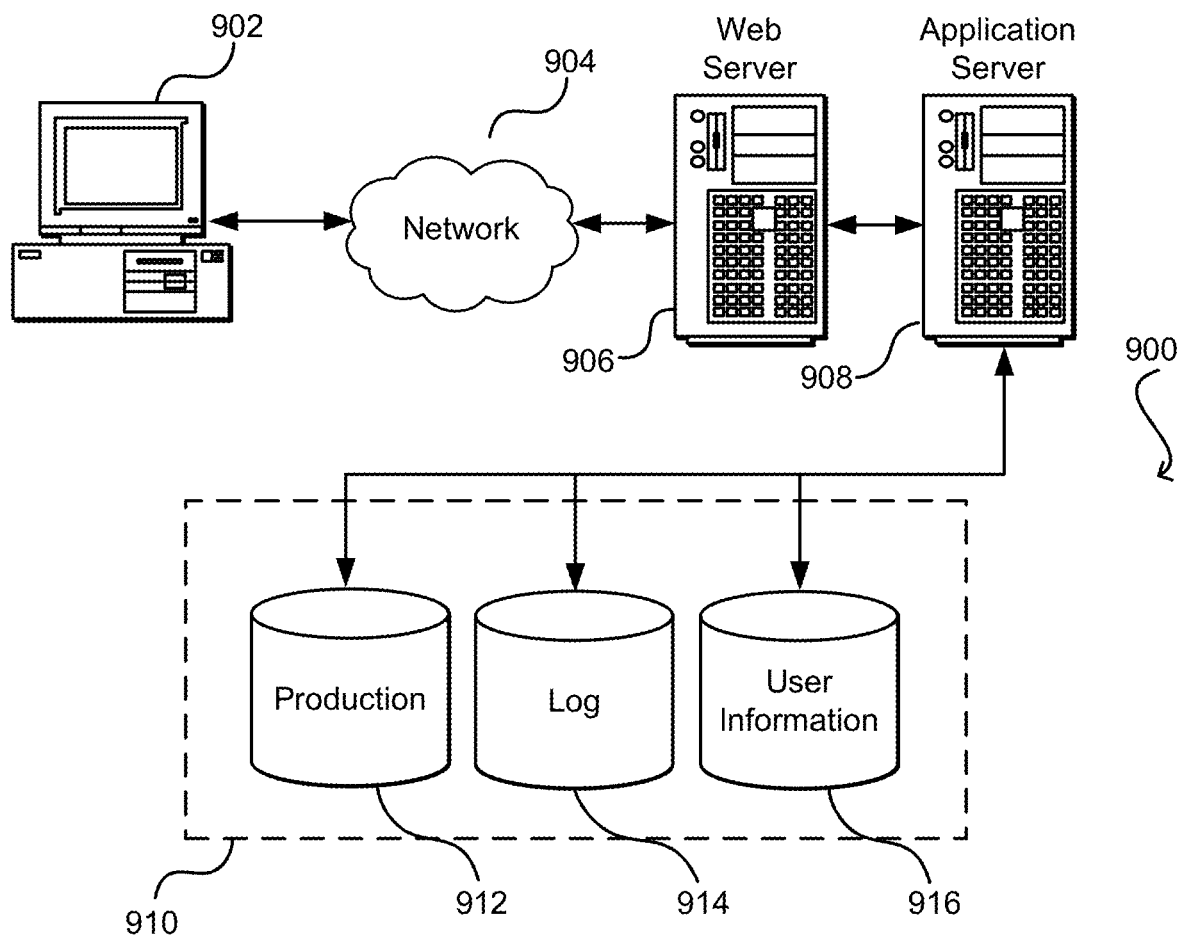
FIG. 9 illustrates an example environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for transforming media content, comprising:

receiving, from a content provider, a source package associated with a content item and including a plurality of source files, each source file having a type of a plurality of predefined types, the plurality of types including: (1) a video type, (2) an audio track type, (3) a timed text type, (4) an interstitial video type, and (5) an image type;

determining a workflow for generating a delivery package based at least in part on the source package, the workflow defining parameters for an execution of one or more transformation modules of a set of transformation modules of a media transformation service (MTS);

generating, by the media transformation service, the delivery package based at least in part on executing the workflow and using the source package as input, the delivery package including a plurality of delivery files, the media transformation service executing the one or more transformation modules of the set of transformation modules to generate the plurality of delivery files based at least in part on transforming respective contents of one or more source files of the source package, the set of transformation modules including:

(1) an overlay module configured at least to overlay a timed text content of the timed text type or an image content of the image type on a video content of the video type, (2) a stitching module configured at least to insert an interstitial video content of the interstitial video type at a location within the video content or remove another interstitial video content from the video content, (3) a color space transformation module configured at least to perform at least one of transforming the video content from a first color space to a second color space or transforming the video content from a first display resolution to a second display resolution, and (4) an audio muxing module configured at least to map an audio track content of the audio track type to the video content; and providing the delivery package to a distribution service for distribution and presentation of the content item in a plurality of target markets.

2. The computer-implemented method of claim 1, wherein the workflow is one of a plurality of workflows that are determined based at least in part on the source package, and the delivery package is one of a plurality of delivery packages, each workflow operable for generating one of the plurality of delivery packages.

3. The computer-implemented method of claim 1, wherein determining the workflow further comprises:
   determining a delivery profile associated with the content provider, wherein the delivery profile indicates the plurality of target markets or languages for which the content item is intended for distribution, and wherein the parameters for the execution of the one or more transformation modules are determined based at least in part on the target markets or languages indicated by the delivery profile.

4. The computer-implemented method of claim 1, wherein the plurality of delivery files corresponds to a first plurality of delivery files and the workflow corresponds to a first workflow, the method further comprising:
   generating, by the media transformation service, a second delivery package based at least in part the source package and a second workflow, the second workflow being different from the first workflow, the second delivery package including a second plurality of delivery files, and wherein at least one aspect of the second plurality of delivery files is different from the first plurality of delivery files based at least in part on the difference between the second workflow and the first workflow.

5. A computer system for generating media delivery packages, comprising:
   a memory comprising computer-executable instructions; and
   one or more processors in communication with the memory and configured to access the memory and execute the computer-executable instructions to perform, at least:
      receiving, from a content provider, a source package associated with a content item and including a plurality of source files, a source file of the plurality of source files having a predefined type of a plurality of predefined types and corresponding to an input for generating a plurality of delivery packages, each delivery package respectively intended for a target entity of a plurality of target entities;
      determining a plurality of workflows, a workflow of the plurality of workflows operable for generating a delivery package of the plurality of delivery packages, the workflow defining parameters for an execution of one or more transformation modules of a set of transformation modules of a media transformation service (MTS), the workflow indicating at least one of: (1) a particular ordering of the execution of the one or more transformation modules, or (2) a particular input for each module of the one or more transformation modules;
      generating, by the media transformation service, the plurality of delivery packages based at least in part on the source package and an execution of respective workflows of the plurality of workflows; and
      providing the plurality of delivery packages to respective target entities of the plurality of target entities for distribution and presentation.

6. The computer system of claim 5, wherein the plurality of predefined types includes: (1) a video type, (2) an audio track type, (3) a timed text type, (4) an interstitial video type, and (5) an image type.

7. The computer system of claim 5, wherein the set of transformation modules includes:
   (1) an overlay module that overlays a timed text content or an image content on or more frames of a sequence of frames of a video content associated with the content item,
   (2) a stitching module that inserts an interstitial video content at a location within the video content or removes another interstitial video content from the video content,
   (3) a color space transformation module that performs at least one of transforming the video content from a first color space to a second color space or transforming the video content from a first display resolution to a second display resolution, and
   (4) an audio muxing module that maps an audio track content to the sequence of frames of the video content.

8. The computer system of claim 7, wherein the timed text content corresponds to a subtitle, a caption, or forced narrative, and wherein the timed text content is overlaid onto a portion of the one or more frames of the video content in a vertical or horizontal orientation.

9. The computer system of claim 7, wherein the interstitial video content corresponds to one or more placeholder frames associated with an advertisement video content, and wherein the location is adjacent to at least one frame of the video.

10. The computer system of claim 7, wherein the first color space corresponds to a high dynamic range (HDR) and the second color space corresponds to a standard dynamic range (SDR).

11. The computer system of claim 7, wherein the first display resolution corresponds to an ultra-high definition (UHD) resolution and the second display resolution corresponds to a high definition (HD) resolution.

12. The computer system of claim 7, wherein the audio track content corresponds to an alternate audio track content, the video content including an original video (OV) audio track content, and wherein the audio muxing module removes the original video audio track content from the video content and maps the alternative audio track content to the sequence of frames of the video content.

13. The computer system of claim 5, wherein determining the plurality of workflows further comprises:
   determining a delivery profile associated with the content provider, wherein the delivery profile indicates the plurality of target entities associated with the distribution of the content item, and wherein the parameters defined by the workflow and used for execution of the one or more transformation modules are determined based at least in part on a target entity of the plurality of the target entities indicated by the delivery profile.

14. The computer system of claim 5, wherein determining the plurality of workflows further comprises:
   receiving an updated requirement associated with at least one of the target entities;
   determining an adjustment of at least one of (1) the particular ordering of the execution of the one or more transformation modules, or (2) a particular input for at least one module of the one or more transformation modules based at least in part on the updated requirement; and
   associating the adjustment with the target entity.

15. The computer system of claim 5, wherein the plurality of target entities includes a first target entity and a second target entity, the first target entity associated with a first format associated with a first standard, the second target entity associated with a second format associated with a second standard, and wherein the first format and the second format are different.

16. One or more non-transitory computer-readable storage media comprising computer-executable instructions that, when executed by one or more processors of a computer system, cause the computer system to perform, at least:

receiving, from a content provider, a source package associated with a content item and including a plurality of source files, each source file having a type of a plurality of predefined types, the plurality of types including at least one of: (1) a video type, (2) an audio track type, (3) a timed text type, (4) an interstitial video type, or (5) an image type;

determining a plurality of workflows based at least in part on the source package, a workflow of the plurality of workflows operable for generating a delivery package of a plurality of delivery packages, the workflow defining parameters for an execution of one or more transformation modules of a set of transformation modules of a media transformation service (MTS), the workflow indicating at least one of: (1) a particular ordering of the execution of the one or more transformation modules, or (2) a particular input for each module of the one or more transformation modules;

generating, by the media transformation service, the plurality of delivery packages based at least in part on the source package and an execution of respective workflows of the plurality of workflows; and providing the plurality of delivery packages to a target entity for distribution and presentation.

17. The one or more non-transitory computer-readable storage media of claim 16, wherein the target entity corresponds to a first target entity of a plurality of target entities, the plurality of target entities also including a second target entity, the first target entity associated with a first format associated with a first standard, the second target entity associated with a second format associated with a second standard, and wherein the first format and the second format are different.

18. The one or more non-transitory computer-readable storage media of claim 17, wherein the set of transformation modules is operable for producing delivery packages according to different formats associated with one or more of the plurality of target entities, based at least in part on the source package.

19. The one or more non-transitory computer-readable storage media of claim 16, wherein determining the plurality of workflows further comprises:

receiving, from the content provider, a source manifest that is associated with the source package, the source manifest including instructions that are used to define one or more of the parameters for the execution of the one or more transformation modules.

20. The one or more non-transitory computer-readable storage media of claim 19, wherein one of the set of transformation modules is an audio muxing module, wherein the audio muxing module is configured to receive as input a selection of an algorithm of a plurality of candidate algorithms for performing a function of the audio muxing module, the plurality of candidate algorithms including a reencoding algorithm and a repackaging algorithm, and wherein instructions included by the source manifest include a selection of one of the plurality of algorithms.

* * * * *